United States Patent
Komashinskiy et al.

(10) Patent No.: US 12,284,198 B2
(45) Date of Patent: Apr. 22, 2025

(54) THREAT CONTROL METHOD AND SYSTEM

(71) Applicant: WithSecure Corporation, Helsinki (FI)

(72) Inventors: Dmitriy Komashinskiy, Helsinki (FI); Paolo Palumbo, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 216 days.

(21) Appl. No.: 17/956,470

(22) Filed: Sep. 29, 2022

(65) Prior Publication Data

US 2023/0097370 A1    Mar. 30, 2023

(30) Foreign Application Priority Data

Sep. 29, 2021 (EP) .................................. 21199717

(51) Int. Cl.
*H04L 9/40* (2022.01)
*G06F 21/55* (2013.01)

(52) U.S. Cl.
CPC ........ *H04L 63/1425* (2013.01); *G06F 21/552* (2013.01); *G06F 21/554* (2013.01); *H04L 63/1416* (2013.01); *H04L 63/1441* (2013.01); *H04L 63/1475* (2013.01)

(58) Field of Classification Search
CPC ............. H04L 63/1425; H04L 63/1416; H04L 63/1441; H04L 63/1475; G06F 21/552; G06F 21/554
See application file for complete search history.

(56) References Cited

U.S. PATENT DOCUMENTS

| | | | | |
|---|---|---|---|---|
| 10,230,743 | B1* | 3/2019 | Block | ................. H04L 63/1416 |
| 2009/0254970 | A1* | 10/2009 | Agarwal | ............... G06F 21/554 |
| | | | | 726/1 |
| 2016/0191560 | A1* | 6/2016 | Pegna | ................... G06F 21/552 |
| | | | | 726/23 |

FOREIGN PATENT DOCUMENTS

| | | |
|---|---|---|
| EP | 3 223 486 | 9/2017 |
| WO | 2020/212442 | 10/2020 |

OTHER PUBLICATIONS

European Search Report dated Feb. 25, 2022, for EP 21 19 9717, 2 pp.

* cited by examiner

*Primary Examiner* — Cheng-Feng Huang
(74) *Attorney, Agent, or Firm* — NIXON & VANDERHYE

(57) ABSTRACT

Disclosed is a system and a method of threat detection in a computer network, the method including detecting by a first node a security threat, e.g. relating to anomalous or malicious behavior, digital object and/or context, at the first node, collecting context information at the first node relating to the detected security threat, reporting at least one detected security threat and the collected context information to at least a second node, analyzing at the second node the received information relating to the security threat and collecting context information relating to the analysis at the second node, and sending the threat related information with added analysis and context information collected from the second node to at least one further node or backend.

20 Claims, 3 Drawing Sheets

THREAT CONTROL METHOD AND SYSTEM

This application claims priority to EP 21199717.6, filed Sep. 29, 2021, the entire contents of which are hereby incorporated by reference.

TECHNICAL FIELD

The present invention relates to a method of threat control in a computer network security system and to a computer network security system.

BACKGROUND

Computer network security systems have started to become popular. An example of such is known as Endpoint Detection & Response (EDR) products and services. EDR focuses on the detection and monitoring of a breach as it occurs and after it occurs and helps to determine how best to respond and/or take automated action. The growth of EDR has been made possible in part by the emergence of machine learning, big data and cloud computing.

Traditional EDR or other similar systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analyzed and scanned by the EDR provider for signs of security breaches and anomalies.

Data volumes and threat surfaces expand at enormous rates. As threats against the computer systems can be tailored at rapid rates, also security models against the threats need to evolve. It will not be possible to keep up with ever increasing cyber threats, both file-based and file-less, by using present "simple" endpoint protection methods nor purely by enhancing the capabilities of the cloud and backend. However, smarter endpoints also pose multiple problems in terms of vulnerabilities, increasing capabilities and data privacy requirements. Thus, traditional means simply cannot address the speed of change and variety of situations encountered.

In the current systems the communication between the data collectors i.e. sensors and backend is rather one-directional although the default mechanisms like upgrades and updates do exist. In the prior art systems sensors collect and submit data to backend.

The backend processes the data submitted by sensors in a centralized manner and looks for indicators of attacks, anomalies etc. The backend can manipulate level of data collection intensity and granularity by preparing new updates that are in own turn propagated to sensors. In the prior art systems, the sensors have basic local anomaly detection mechanisms e.g. rule and/or machine learning driven mechanisms, that produce additional events used by the backend to flag threats and optimize its operations. This functionality is controlled by the backend via default upgrade and update mechanisms.

The problem with the current systems is that there are some cases, such as exploitation, worm-able threats, e.g. WannaCry, and hands-on keyboard attacks, in which the knowledge of malicious activities happening at a single endpoint is not enough to provide sufficient situational awareness and to help in remediating the threat. In most cases, an attack involves multiple hosts through which an attacker moves searching for its ultimate target. It is clear, that a detection system with mainly one-directional the communication between the data collectors i.e. sensors and backend as described above will face multiple challenges, such as:

1. Combining detections and related information affecting multiple hosts and constructing a single incident from those (meaning a multi-host detection providing enough visibility of an attack together with all relevant context).
2. Providing timely visibility to attacks ongoing in organizations: the facts that backend detection pipeline is centralized might produce unwanted delays in processing events coming from hosts under attack. This makes the vulnerability window bigger that desired.
3. Acquiring relevant data based on posthumous detections. In fact, when backend notices a potential breach at a first host, it is limited in its ability to get historical data pertaining to a second host, where the second host is also assumed to be part of the security incident.

For these reasons there is a need for improved computer network security systems that are able to deal with attacks that are difficult to detect with traditional methods both now and in the future.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to a first aspect, the invention relates to a method of threat detection in a computer network, the method comprising: detecting by a first node a security threat, e.g. relating to anomalous or malicious behavior, digital object and/or context, at the first node, collecting context information at the first node relating to the detected security threat, reporting at least one detected security threat and the collected context information to at least a second node, analyzing at the second node the received information relating to the security threat and collecting context information relating to the analysis at the second node, and sending the threat related information with added analysis and context information collected from the second node to at least one further node or backend.

In one embodiment of the invention the received information is analyzed and sent to a further node or backend until investigation is no longer needed, e.g. the detected threat is identified, the detected item does not affect any node beside that on which it was detected and/or if the information collected reveals that the situation is effectively a false detection.

In one embodiment of the invention the second or further node to which the information is transmitted, e.g. broadcasted, is another host, such as a neighbor, and/or a backend host or system.

In one embodiment of the invention the data relating to the detected security threat comprises information of a specific node, and the second or further node to which the information is sent, is the specific node referenced in the data relating to the detected security threat.

In one embodiment of the invention the data relating to the detected security threat comprises information of a specific application being exploited, and the second or further node to which the information is sent comprises at least one node which has the specific application installed.

In one embodiment of the invention the data relating to the detected security threat indicates a user with unexpected behavior, in which case the node issues a broadcast message to other nodes with information about user-level anomalies so that further tracking can done by the further nodes for the user with unexpected behavior.

In one embodiment of the invention the second or further node to which the data is sent a node having certain IP-address or being in a certain IP-address range and/or a node having seen activities from certain users and/or to the hosts having certain asset id.

In one embodiment of the invention the context information comprises a unique identifier for the detected threat and/or information of the node that sent the information.

In one embodiment of the invention the context information comprises a chain of activity that led to that a detection of the security threat.

In one embodiment of the invention the further nodes receiving information relating to the detected security threat and the collected context information from another host add their context information before their analysis data is sent forward to at least one other host or backend, e.g. the information comprising lead or initial context.

In one embodiment of the invention the security threat is identified at a node by at least one sensor installed at the node configured to implement detection mechanism, such as local anomaly detection mechanism, to identify suspicious entities, such as e.g. misbehaving processes, users, applications or files.

In one embodiment of the invention the node analyzing the security threat transmits, e.g. broadcasts, instructions to its neighbors to increase data collection and data submission levels.

According to a second aspect, the invention relates to a system comprising a computer network comprising at least two nodes, wherein the nodes are configured to detect security threats, e.g. relating to anomalous or malicious behavior, digital object and/or context, at the node. In the system the first node is configured to detect a security threat at the first node, and to collect context information at the first node relating to the detected security threat. The first node is further configured to report at least one detected security threat and the collected context information to at least a second node, wherein the second node is configured to analyze the received information relating to the security threat and to collect context information relating to the analysis at the second node. The second node is further configured to send the threat related information with added analysis and context information collected from the second node to at least one further node or backend.

In one embodiment of the invention the system is configured to implement a method according to any embodiment of the invention.

According to a third aspect, the invention relates to a computer program comprising instructions which, when executed by a computer, cause the computer to carry out a method according to the invention.

According to a fourth aspect, the invention relates to a computer-readable medium comprising the computer program according to the invention.

The invention is able to solve for example the following earlier discussed challenges by providing a mechanism that enables sensors to communicate with each other. With the solution of the invention the context of the detection can be shared for the purpose of further analysis and investigation in a peer-to-peer fashion. Information gathered and created by the hosts, nodes or any devices in the network can flow between any types of entities as long as they use the solution of the invention. This means that one node or entity could be a computer with its own sensor, and the second entity can be similar or a different kind of node, e.g. a network-level IDS that manages the security of a whole network segment.

The solution of the invention enables better detection capabilities, especially for those situations that involve multiple endpoints. Such is the case, for example, in breaches that involve lateral movement and exploration as the attacker moves towards its goal. The solution of the invention also enables better contextualization of detections, meaning that a customer that receives a detection is not only presented with the information that specifically triggered the detection, but instead is presented with the whole chain of activity that lead to that detection.

The achievable benefits of the solution of the invention comprise also the following:
  Consistent and complete representation of cross host activities that are relevant from cyber perspective
  Decreased vulnerability window for EDR solutions
  Improved adaptiveness of the solution in terms of data collection and/or processing
  The system can be at the same time backend driven (e.g. once backend receives a notification about first time passed anomalous context, it is aware of this situation and can tune appropriately other sensors and own logic) and sensor-to-sensor communication driven (e.g. the first sensor can broadcast instructions to its neighbors to increase data collection and submission levels).

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

Figure 1:
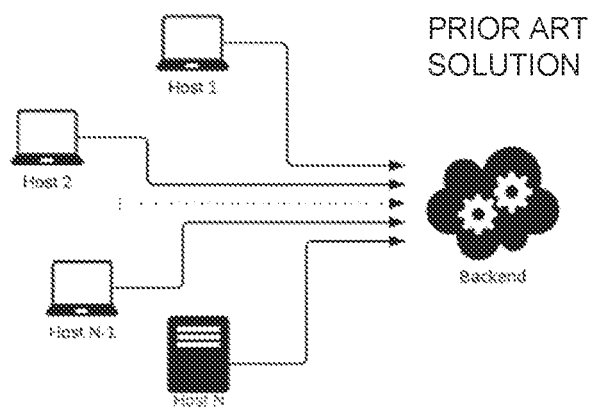
FIG. 1 illustrates communication flow of a prior art system between the hosts and the backend.

FIG. 1 illustrates communication flow of a prior art system between the hosts and the backend. In the prior art systems, the sensor-backend communication is rather one-directional. In these systems sensors at the hosts collect and submit data to backend as illustrated in the FIG. 1. In these prior art solutions, the backend processes the data submitted by sensors in a centralized manner and looks for indicators of attacks or anomalies. The backend can manipulate level of data collection intensity and granularity by preparing new updates that are in own turn propagated to sensors. In prior art systems the sensors at the hosts have basic local anomaly detection mechanisms, such as rule or machine learning driven mechanisms, that produce additional events used by the backend to flag threats and optimize its operations. This can be controlled by the backend via default upgrade or update mechanisms.

As described above, the idea of the invention is to provide a mechanism that enables sensors to communicate with each other. With the solution of the invention the context of the detection can be shared for the purpose of further analysis and investigation in a peer-to-peer fashion. The nodes can for example share detection related data, such as detection related context data and data related to responding to the threat. In one embodiment of the invention this threat detection related data is share inside a swarm network.

The invention relates to a system and method of threat detection in a computer network, the method comprising: detecting by a first node a security threat, e.g. relating to anomalous or malicious behavior, digital object and/or context, at the first node, collecting context information at the first node relating to the detected security threat, reporting at least one detected security threat and the collected context information to at least a second node, analyzing at the second node the received information relating to the security threat and collecting context information relating to the analysis at the second node, and sending the threat related information with added analysis and context information collected from the second node to at least one further node or backend.

In one embodiment of the invention the received information is analyzed and sent to a further node or backend until investigation is no longer needed, e.g. the detected threat is identified, the detected item does not affect any node beside that on which it was detected and/or if the information collected reveals that the situation is effectively a false detection.

Figure 2:
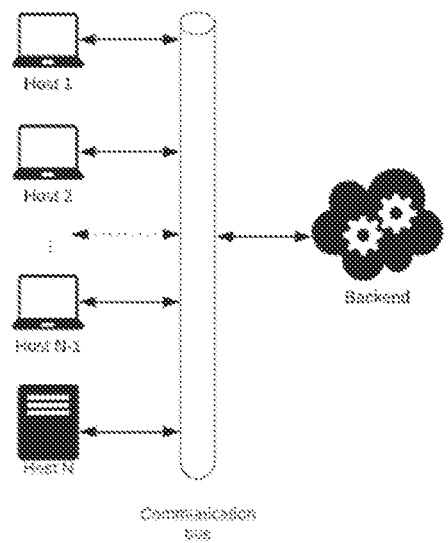
FIG. 2 illustrates communication flow between the hosts and the backend according to one example embodiment of the present invention.

FIG. 2 illustrates communication flow between the hosts and the backend according to one example embodiment of the present invention. The solution of the present invention provides a mechanism that enables sensors to communicate with each other. This can be understood (at least in some embodiments) as a communication bus between the hosts of a network.

In the solution of the invention one of the roles of the backend is to facilitate the distributed anomaly context enrichment. Sensors installed at endpoints, such as hosts or nodes, rely on local anomaly detection mechanism to identify suspicious entities, e.g. misbehaving processes, contexts or users.

The nodes or hosts can have a mechanism for deciding when a local anomaly is to be reported to a specific other host, instrumented by a sensor and/or broadcasted. Some exemplary cases can be for example:

The anomaly is reported to a specific host or the backend if it is known which element is up to continue checking the anomaly.
The anomaly is reported to a specific host who is known to be in a risk to be affected by the detected anomaly, for example:
    To every host or at least some hosts having certain application
    To the host having certain network address, e.g. certain IP address, or being in a certain network address range, e.g. certain IP address range
    To the hosts having seen activities from certain users
    To the hosts having certain asset id In one embodiment of the invention the data relating to the detected security threat comprises information of a specific node, and the second or further node to which the information is sent, is the specific node referenced in the data relating to the detected security threat.

In one embodiment of the invention the data relating to the detected security threat comprises information of a specific application being exploited, and the second or further node to which the information is sent comprises at least one node which has the specific application installed.

In one embodiment of the invention the data relating to the detected security threat indicates a user with unexpected behavior, in which case the node issues a broadcast message to other nodes with information about user-level anomalies so that further tracking can done by the further nodes for the user with unexpected behavior.

In one embodiment of the invention the second or further node to which the data is sent a node having certain IP-address or being in a certain IP-address range and/or a node having seen activities from certain users and/or to the hosts having certain asset id.

In one embodiment of the invention the second or further node to which the information is transmitted, e.g. broadcasted, is another host, such as a neighbor, and/or a backend host or system. In one embodiment of the invention, if it's not known to whom the anomaly should be reported, the node can broadcast the data related to the detected anomaly. In this case for example the other nodes can investigate the findings and carry out further actions.

Based on the received information and data related to the detected anomaly received from the first node, additional information can be collected by the other nodes of the network. In one example the node investigates the anomaly and adds its own context and findings to the original findings received by the node. Then the node can send data related to the anomaly further and at the same time add its own findings for the anomaly. This can be continued as long as necessary and for example as until no further investigations by further nodes are needed.

The structure of the anomaly detection reporting can be the following in one example embodiment of the invention. The data which is transmitted from one node to another and/or to the back end can comprise at least one of the following:
    a unique ID to make the context tractable from the backend's perspective,
    information about the context of the detected anomaly, e.g. the initial context and added contexts,
    information about ownership changes,
    other meaningful observations.

In one embodiment of the invention the context information comprises a unique identifier for the detected threat and/or information of the node that sent the information.

In one embodiment of the invention the context information comprises a chain of activity that led to that a detection of the security threat.

In one embodiment of the invention the further nodes receiving information relating to the detected security threat and the collected context information from another host add their context information before their analysis data is sent forward to at least one other host or backend, e.g. the information comprising lead or initial context.

In one embodiment of the invention the security threat is identified at a node by at least one sensor installed at the node configured to implement detection mechanism, such as local anomaly detection mechanism, to identify suspicious entities, such as e.g. misbehaving processes, users, applications or files.

In one embodiment of the invention the node analyzing the security threat transmits, e.g. broadcasts, instructions to its neighbors to increase data collection and data submission levels.

Figure 3:
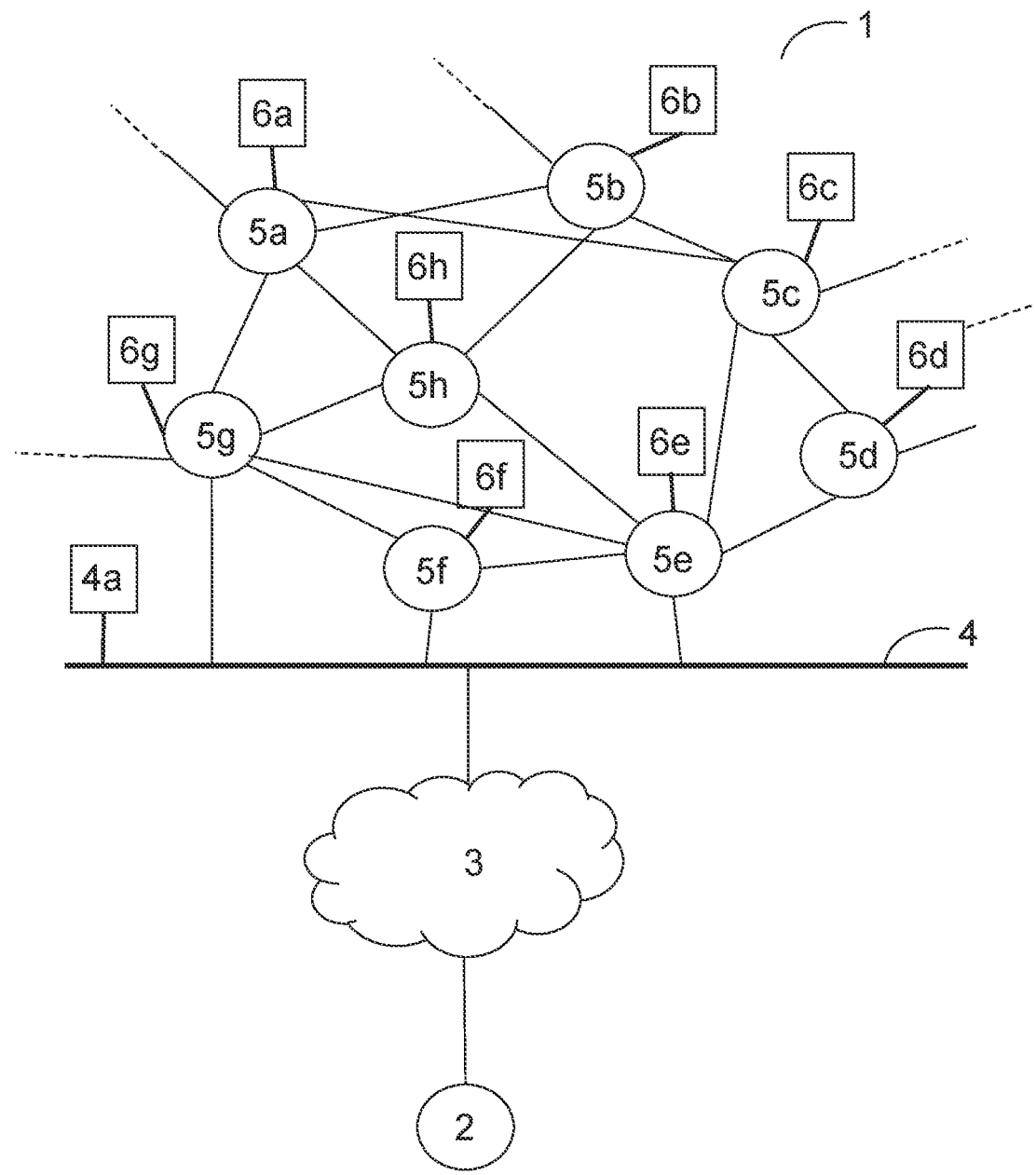
FIG. 3 illustrates an example of computer network system according to an embodiment.

FIG. 3 illustrates schematically a part of a first computer network 1 into which a computer system, for example an EDR system, has been installed. Also any other computer system that is able to implement the embodiments of the invention can be used instead or in addition to the EDR system used in this example. The first computer network is connected to a security service network, here security backend/server 2 through the cloud 3. The backend/server 2 forms a node on the security service computer network relative to the first computer network. The security service computer network is managed by an EDR system provider and may be separated from the cloud 3 by a gateway or other interface (not shown) or other network elements appropriate for the backend 2. The first computer network 1 may also be separated from the cloud 3 by a gateway 4 or other interface. Other network structures are also envisaged.

The first computer network 1 is formed of a plurality of interconnected network nodes 5a-5h, each representing an element in the computer network 1 such as a computer, smartphone, tablet, laptop, or other piece of network enabled hardware. The nodes can communicate with each other in accordance with the solution of the invention. Each network node 5a-5h shown in the computer network can also represent an EDR endpoint onto which a security agent module 6a-6h, that may include a data collector or "sensor", is installed. Security agent modules may also be installed on any other element of the computer network, such as on the gateway or other interface. A security agent module 4a has been installed on the gateway 4 in FIG. 1. The security agent modules, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. TCP dumps).

The data collected by the nodes of the network can comprise information related to detected anomalies with added context gathered based on the solution of the present invention. The collected data may be stored in a database or similar model for information storage for further use. Any kind of behavior profiles/representations of behaviors of applications/services/processes may further be constructed at the nodes 5a-5h by a security application, at the backend/server 2, and/or at a second server and be stored in the database. The nodes 5a-5h and the server 2 typically comprise a hard drive, a processor, and RAM.

It is envisaged that any type of data which can assist in detecting and monitoring a security threat, such as a security breach or intrusion into the system, may be collected by the security agent modules 6a-6h, 4a during their lifecycle and that the types of data which are observed and collected may be set according to rules defined by the EDR system provider upon installation of the EDR system or in response to instructions from the EDR backend 2. In an embodiment of the present invention, at least part of the security agent modules 6a-6h may also have capabilities to make decisions on the types of data observed and collected themselves. For example, the security agents 6a-6h, 4a may collect data about the behavior of programs running on an EDR endpoint and can observe when new programs are started. Where suitable resources are available, the collected data may be stored permanently or temporarily by the security agent modules 6a-6h, 4a at their respective network nodes or at a suitable storage location on the first computer network 1.

The security agent modules 6a-6h, 4a are set up such that they send information such as the data they have collected to other hosts, e.g. as described in this document, and/or to backend. The security agent modules can send and receive instructions to/from the other hosts and/or the backend 2, e.g. through the cloud 3. This allows the EDR system provider to remotely manage the EDR system without having to maintain a constant human presence at the organization which administers the first computer network 1.

In one embodiment of the invention the security agent modules 6a-6h, 4a can also be configured to establish a swarm intelligence network that comprises the security agent modules of the plurality of interconnected network nodes 5a-5h of the local computer network 1. As the security agent modules 6a-6h, 4a collect data related to the respective network nodes 5a-5h of each security agent module 6a-6h, 4a, they are further configured to share information that is based on the collected data in the established swarm intelligence network according to the solution of the invention. The swarm intelligence network is comprised of multiple semi-independent security nodes (security agent modules) which are capable of functioning on their own as well. Thus, the numbers of instances in a swarm may well vary. There may also be more than one connected swarms in one local computer network, which collaborate with one another.

The security agent modules 6a-6h, 4a are further configured to use the collected data and information received from the internal swarm intelligence network for generating and adapting models related to the respective network node 5a-5h. For example, in case a known security threat is detected, the security agent module 6a-6h, 4a is configured to generate and send a security alert to the internal swarm intelligence network and to a local center node (not shown) in the local computer network and to activate security measures for responding to the detected security threat. Further, in case an anomaly that is estimated very likely to be a new threat is identified, the security agent module 6a-6h, 4a is configured to verify and contain the threat, generate a new threat model on the basis of the collected data and received information and share the generated new threat model in the internal swarm intelligence network and the local center node. The data collected by the nodes of the swarm intelligence network can comprise information related to detected anomalies with added context gathered based on the solution of the present invention.

Next practical example steps of an operation according to some embodiments will be described.

Deployment: As all agents may fundamentally have the same code base and ability to adapt to their role by activating different components in their modular architecture and replicate themselves, one would merely need to deploy one initial agent in a customer network with sufficient access rights, which would then discover servers and install copies of itself in the suitable locations and establish the swarm internal communications network as well as the backend update, reporting and communication channel. In addition, authentication and other required issues may need to be considered, and in first incarnations agents may be deployed on individual hosts.

Normal operation: The agents continuously monitor their environment and collect data, learning from what they see and build models of their hosts and their surroundings. These models may be shared across swarm nodes and used for learning, for example of users' behavior on one computer vs. others in the network. Additionally, abstract information may be sent to other nodes or the backend in a privacy preserving way. The agents utilize the abovementioned learning models to be prepared also for knowing what is normal.

Encountering a known threat: The agents detecting either a known threat or an anomaly indicating a known threat may instantly alert their swarm mates of the situation as described above and, also to prepare for threats that may deactivate them, and call for additional resources if needed (spin up new virtual agents or have them delivered from another host if there is risk of compromise). If the agent already has the means for response, that action may be taken. The detected anomaly can be communicated to other nodes or backend in accordance with the solution of the invention. The nodes can for example share detection related data, such as detection related context data and data related to responding to the threat.

Encountering a novel threat: The agents, due to constantly learning what is normal and in a very granular manned due to their specificity with the data of their own nodes, are also equipped to detect novel threats. The detected threat or anomaly can be communicated to other nodes or backend in accordance with the solution of the invention. The ability of the nodes to interact with the users will be used to verify the threat, and if the threat is verified, take actions to contain it as well as build a new threat model that will be circulated, in the known language, to both swarm mates and also other customers through the central link. In some embodiments, the risk of the threat may be determined to be so great that autonomous containment actions may also be taken before awaiting a final decision. The degree of autonomous actions can always be adjusted as needed. The connectivity model also allows for the help of human experts to be called upon if needed.

Neutralizing a novel threat: The agents may also contain sandbox capabilities, which could be utilized for a safe environment and also containment, allowing for the use of evolutionary approaches for detecting how to neutralize the novel threat (try—evaluate—mutate—try again) as well as understanding the behavior of such threats in much greater detail and further conveying that information.

Sharing new threat knowledge: as new threats are identified, they are encoded into the internal language representation for sharing across agents, centrally and therefrom also to other customers to ensure optimal protection of all customers in a privacy preserving manner.

Backend preparation: Constantly during operation, the information on both events and threats can be abstracted and sent to the backend. This enables a backend "laboratory" to continue experimentation on more effective defense tools in a secure (sandbox-like) environment as well as provides further correlation and analysis of the data sent from the multitude of individual intelligent sensors.

Figure 4:
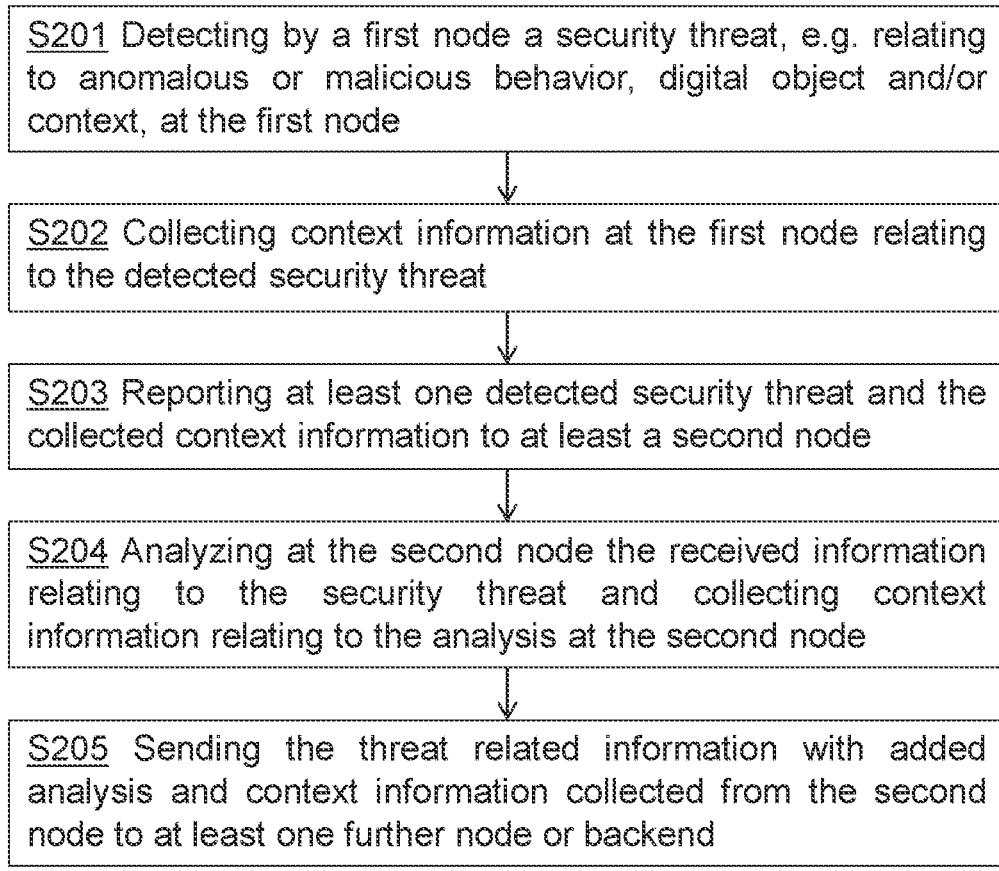
FIG. 4 presents a flow diagram illustrating an example of a threat control method according to an embodiment.

FIG. 4 is a flow diagram illustrating an example of a threat control method according to an embodiment.

In S201, detecting by a first node a security threat, e.g. relating to anomalous or malicious behavior, digital object and/or context, at the first node.

In S202, collecting context information at the first node relating to the detected security threat.

In S203, reporting at least one detected security threat and the collected context information to at least a second node.

In S204, analyzing at the second node the received information relating to the security threat and collecting context information relating to the analysis at the second node.

In S205, sending the threat related information with added analysis and context information collected from the second node to at least one further node or backend.

In an embodiment, a suspicious event among the monitored events may be detected by one or more detection mechanisms used. In an embodiment, the detection mechanisms used to detect the suspicious event may comprise using at least one of: a machine learning models, a scanning engine, a heuristic rule, a statistical anomaly detection, fuzzy logic-based models, any predetermined rules.

In an embodiment, information on alerts, statuses and other relevant entities are shared by using at least one language model for enabling the information to be interpretable by both computer systems and human experts.

As described above, the nature of a threat detection model used in the system (e.g. EDR) may be, or may incorporate elements, from one or more of the following: a neural network trained using a training data set, exact or heuristic rules (e.g. hardcoded logic), fuzzy logic based modelling, and statistical inference based modelling. The threat detection model may be defined to take into account particular patterns, files, processes, connections, and dependencies between processes.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. Lists and groups of examples provided in the description given above are not exhaustive unless otherwise explicitly stated.

The invention claimed is:

1. A method of threat detection in a computer network, the method comprising:
   detecting, by a first node, a security threat at the first node;
   collecting context information at the first node relating to the detected security threat;
   reporting at least one detected security threat and the collected context information to at least a second node;
   analyzing, at the second node, the received information relating to the security threat and collecting context information relating to the analysis at the second node; and
   sending the threat related information with added analysis and context information collected from the second node to at least one further node or backend,
   wherein the first node, the second node, and the at least one further node are computers, smartphones, tablets, or laptops.

2. The method according to claim 1, wherein the received information is analyzed and sent to a further node or backend until investigation is no longer needed.

3. A system comprising:
a computer network comprising at least two nodes, the at least two nodes being configured to detect security threats at the node,
wherein, in the system, the first node is configured to detect a security threat at the first node, and to collect context information at the first node relating to the detected security threat,
the first node is further configured to report at least one detected security threat and the collected context information to at least a second node,
wherein the second node is configured to analyze the received information relating to the security threat and to collect context information relating to the analysis at the second node,
the second node is further configured to send the threat related information with added analysis and context information collected from the second node to at least one further node or backend, and
wherein the system is configured to implement the method according to claim 2.

4. The method according to claim 2, wherein the second or further node to which the information is transmitted is another host.

5. The method according to claim 2, wherein data relating to the detected security threat comprises information of a specific node and the second or further node to which the information is sent, is the specific node referenced in the data relating to the detected security threat.

6. The method according to claim 2, wherein data relating to the detected security threat comprises information of a specific application being exploited and the second or further node to which the information is sent comprises at least one node which has the specific application installed.

7. The method according to claim 1, wherein the second or further node to which the information is transmitted is another host.

8. The method according to claim 7, wherein data relating to the detected security threat comprises information of a specific node and the second or further node to which the information is sent, is the specific node referenced in the data relating to the detected security threat.

9. The method according to claim 1, wherein data relating to the detected security threat comprises information of a specific node and the second or further node to which the information is sent, is the specific node referenced in the data relating to the detected security threat.

10. The method according to claim 1, wherein data relating to the detected security threat comprises information of a specific application being exploited and the second or further node to which the information is sent comprises at least one node which has the specific application installed.

11. The method according to claim 1, wherein data relating to the detected security threat indicates a user with unexpected behavior, in which case the node issues a broadcast message to other nodes with information about user-level anomalies so that further tracking can done by the further nodes for the user with unexpected behavior.

12. The method according to claim 1, wherein the second or further node to which the data is sent is a node having certain IP-address or is in a certain IP-address range and/or is a node having seen activities from certain users and/or is a node having certain asset id.

13. The method according to claim 1, wherein the context information comprises a unique identifier for the detected threat and/or information of the node that sent the information.

14. The method according to claim 1, wherein the context information comprises a chain of activity that led to that a detection of the security threat.

15. The method according to claim 1, wherein the further nodes receiving information relating to the detected security threat and the collected context information from another host add the receiving nodes' context information before the receiving nodes' analysis data is sent forward to at least one other host or backend.

16. The method according to claim 1, wherein the security threat is identified at a node by at least one sensor installed at the node configured to implement detection mechanism to identify suspicious entities.

17. The method according to claim 1, wherein the node analyzing the security threat transmits instructions to neighbors of the node analyzing the security threat to increase data collection and data submission levels.

18. A non-transitory computer-readable medium on which is stored a computer program comprising instructions which, when executed by a computer, cause the computer to carry out the method according to claim 1.

19. The method according to claim 1, wherein the first node, the second node, and the at least one further node are endpoint devices.

20. A system comprising:
a computer network comprising at least two nodes, the nodes being configured to detect security threats at the node,
wherein, in the system, the first node is configured to detect a security threat at the first node, and to collect context information at the first node relating to the detected security threat,
the first node is further configured to report at least one detected security threat and the collected context information to at least a second node,
wherein the second node is configured to analyze the received information relating to the security threat and to collect context information relating to the analysis at the second node,
the second node is further configured to send the threat related information with added analysis and context information collected from the second node to at least one further node or backend, and
wherein the first node, the second node, and the at least one further node are computers, smartphones, tablets, or laptops.

* * * * *